United States Patent
Schöffel

[11] Patent Number: 5,562,016
[45] Date of Patent: Oct. 8, 1996

[54] CENTERING DEVICE, IN PARTICULAR, A CENTERING DEVICE FOR STEERING VALVES

[75] Inventor: Jörgen Schöffel, Schwäbisch Gmünd, Germany

[73] Assignee: ZF Friedrichshafen AG, Friedrichshafen, Germany

[21] Appl. No.: 406,995

[22] PCT Filed: Sep. 17, 1993

[86] PCT No.: PCT/EP93/02521

§ 371 Date: Mar. 29, 1995

§ 102(e) Date: Mar. 29, 1995

[87] PCT Pub. No.: WO94/07732

PCT Pub. Date: Apr. 14, 1994

[30] Foreign Application Priority Data

Sep. 30, 1992 [DE] Germany ............... 42 32 813.6

[51] Int. Cl.⁶ ..................................... F15B 9/10
[52] U.S. Cl. .................. 91/375 A; 180/417; 403/328
[58] Field of Search ............... 91/375 R, 375 A; 180/132, 141; 403/327, 328

[56] References Cited

U.S. PATENT DOCUMENTS

| | | | |
|---|---|---|---|
| 3,645,296 | 2/1972 | Adams | 91/375 A X |
| 3,698,748 | 10/1972 | Petri | 403/328 |
| 4,711,315 | 12/1987 | Kitamura | 91/375 R X |
| 4,790,793 | 12/1988 | Bacardit . | |
| 5,070,957 | 12/1991 | Harkrader et al. | 180/191 |
| 5,109,753 | 5/1992 | Kobayashi | 91/375 A |
| 5,190,119 | 3/1993 | Nomura et al. | 91/375 A X |

FOREIGN PATENT DOCUMENTS

| | | | |
|---|---|---|---|
| 2404580 | 8/1974 | Germany . | |
| 2044697 | 10/1980 | United Kingdom | 91/375 A |
| 8702318 | 4/1987 | WIPO . | |

*Primary Examiner*—Hoang Nguyen
*Attorney, Agent, or Firm*—Larson & Taylor

[57] ABSTRACT

A centering device for steering valves contains a torsion bar (1) that is clamped between a drive part (2) and a power take-off part (3). Because torsion bar (1) does not permit any exact central positioning, a radial borehole (6) of a valve bushing (3A) connected with the power take-off part (3) is provided. A pin (7) which includes a ball-shaped end engages an oblique surface groove (8) and the pin (7) is loaded by a ring-shaped spring (11). Spring (11) sits in a ring groove (10) and includes a flattened section (12). In the area of the flattened section (12), pin (7) engages a recess (13) of spring (11). The mutually rotatable structural parts can be set exactly in the neutral position by this centering device.

4 Claims, 1 Drawing Sheet

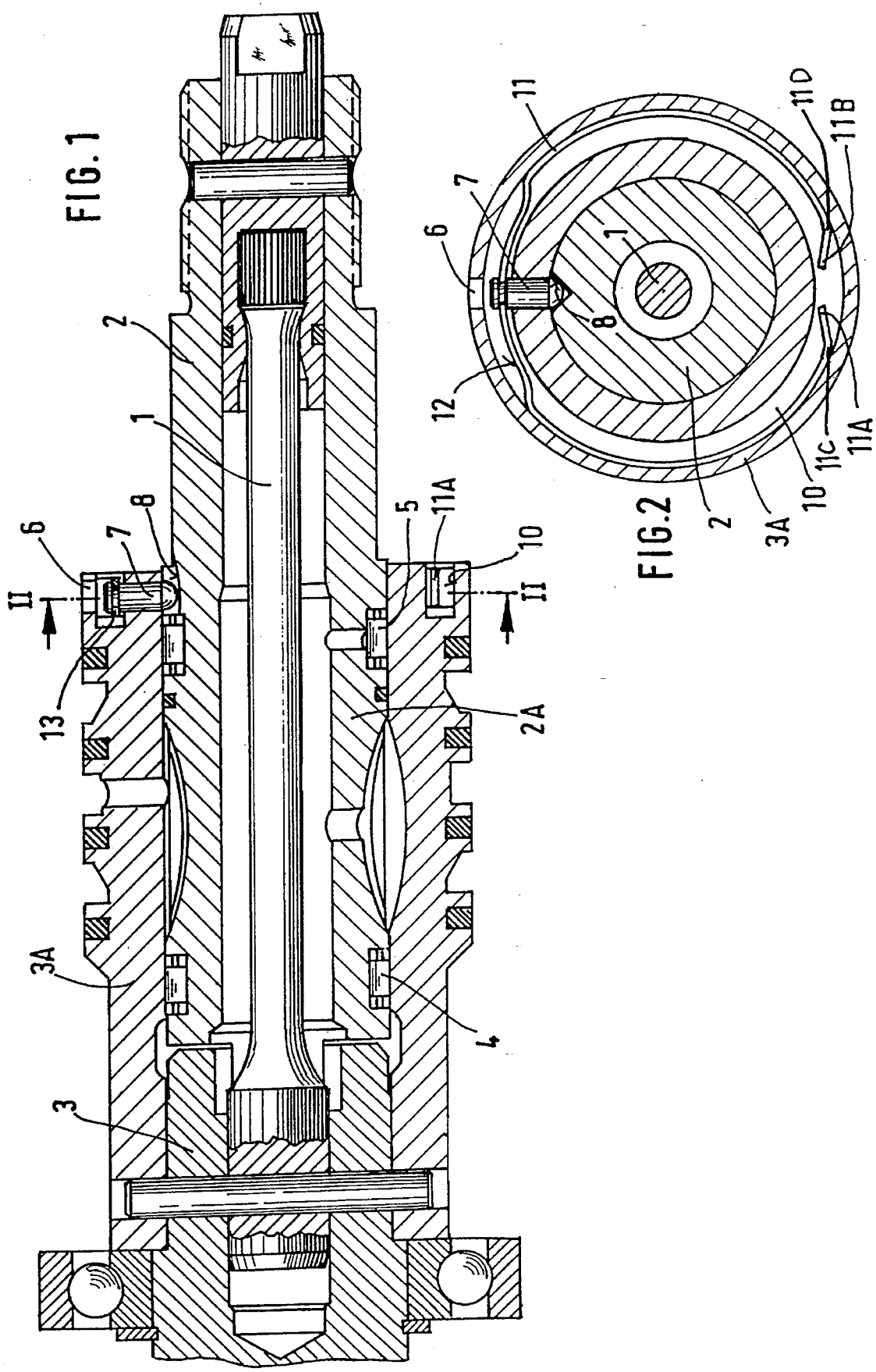

CENTERING DEVICE, IN PARTICULAR, A CENTERING DEVICE FOR STEERING VALVES

BACKGROUND OF THE INVENTION

1. Field of the Invention

This invention relates to a centering device, in particular for steering valves in motor vehicles. In steering gears with a centering device, there are provided a drive part and a power takeoff part, and these parts are connected with each other by means of a torsion bar and are elastically rotatable against each other. The drive part is made in sleeve-fashion and encloses the torsion rod. The power takeoff part again partly encloses the drive part.

2. Description of the Prior Art

Such a centering device can be used advantageously for steering valves in the rotary slide or rotary piston design. EP0244449 contains a model based on this design. This centering device reveals a metallic shock absorber with axial spring action that is attached to the drive part and that acts upon the power takeoff part via a mid-position catch device with prestress. The mid-position catch device consists of the oblique surfaces associated with the two structural parts with roller bodies in between. In this way, one gets, on the drive part, a resetting force that depends on the twisting of the two structural parts and that is added to the twisting force of the torsion bar. The mid-position catch device here primarily takes care of the exact centering of the two structural parts that can be rotated against each other. This mid-position catch device needs an axial and radial installation space mostly on account of the metal shock absorber. Besides, this device requires a comparatively high production effort because one must fasten a centering piece and an end piece to the shock absorber and a centering piece on the power takeoff part.

The task of the invention is to find a centering device combined with a torsion bar that can be made at reasonable cost with a very small axial space requirement.

This problem is solved by the centering device of the present invention. Other more preferred embodiments are also disclosed.

SUMMARY OF THE INVENTION

In a radial borehole of the power takeoff part, a pin loaded by a spring is guided in a radial direction; this pin engages an oblique surface groove of the drive part. Because the spring, the pin, and the oblique surface groove lie in a radial plane, in other words, on top of each other, one can save considerable structural space. The wall thickness of the drive part is completely sufficient to house the centering elements, and one needs no additional axial and radial construction space.

According to a preferred embodiment, one provides a ring groove worked into the front face of the power takeoff part and a slitted, ring-shaped spring is inserted in that ring groove. The spring partly rests in the ring groove and in the area of an anchoring arrangement with the pin, has a flattened section that deviates from the circular shape. In this way, one can get good radial spring properties and adequate clear space for the fastening of the pin.

According to another preferred embodiment, one crimps the ends of the ring-shaped spring inward so that the spring motion in the ring groove will not be impaired by friction losses.

According to yet another preferred embodiment, one best makes the pin end in a ball shape. That improves the gliding properties, The invention will be described in greater detail below with the help of a practical example illustrated in the drawing:

BRIEF DESCRIPTION OF THE DRAWINGS

FIG. 1 is a longitudinal profile through the centering device according to the invention and FIG. 2 is a lateral profile along line II—II in FIG. 1.

DETAILED DESCRIPTION OF THE PREFERRED EMBODIMENTS

According to FIGS. 1 and 2, the centering device has a torsion bar 1 that at its thickened ends is pinned together with a drive part 2 and a power takeoff part 3. Drive part 1 in its extension, for example, carries a rotary slide 2A that encloses the active part of torsion bar 1 almost over its entire length. Adjoining drive part 3 is a valve bushing 3A that is nonrotatably connected with said part, and in it, the rotary slide 2A can perform a relative term. To reduce the friction, one can provide needle bearings 4 and 5 between rotary slide 2A and valve bushing 3A. Rotary slide 2A and valve bushing 3A in the known manner form a rotary slide valve. In place of a rotary slide valve, one can also provide a rotary piston valve of known design.

According to the invention, the valve bushing has a radial borehole 6 in which a pin 7 is guided movably. With a ball-shaped end, pin 7 engages an oblique surface groove B of drive part 2. A ring groove 10 is worked into the free front face of valve bushing 3A, and this ring groove accepts a slitted ring-shaped spring 11. In the area of a flattened section 12, pin 7 is suspended in a recess 13 of spring 11. Adjoining the flattened section 12 are segments 11A and 11B that rest against the outer wall of ring groove 10. These segments 11A and 11B provide good spring attenuation. Here, it is practical to crimp the ends 11C and 11D.

When drive part 2 and power takeoff part 3 perform a limited rotation movement to regulate a pressure with respect to each other, then one of the oblique surfaces of oblique surface groove 8 forces pin 7 upward. In the process, the flattened section 12 likewise arches upward. If no further rotary force actions on drive part 2, then pin 7—due to the combined force of torsion bar 1 and ring-shaped spring 11—again moves downward into the drawn neutral position. The centering device consisting of spring 11, pin 7, and oblique surface groove 8 here ensures the exact mid-positioning of rotary slide valve 2A and 3A.

We claim:

1. A centering device for steering valves in motor vehicles which comprises:

a drive part (2) and a power take-up (3) that are connected with each other by a torsion bar (1) and which are elastically rotatable against each other, wherein the drive part (2) is in the form of a sleeve which encloses the torsion bar (1) and the power take-off part (3) partly encompasses the drive part (2); and includes a front face that is provided with a ring groove (10);

a pin (7) guided in a radial borehole (6) of the power take-off part (3) such that the pin (7) engages an oblique surface groove (8) of the drive part (2), and wherein the pin (7) is loaded in a radial direction by a ring-shaped spring (11) that is inserted into the ring groove (10) in the front face of the power take-off part and is anchored to pin (7).

2. A centering device as claimed in claim 1 wherein the pin (7) has a generally circular shape except for a flattened section (12) and the ring-shaped spring (11) is anchored to the pin (7) in the area of the flattened section (12) of the pin (7).

3. A centering device according to claim 1 wherein spring (11) includes ends (11A, 11B) which are crimped inwardly.

4. A centering device according to claim 1 wherein the pin (7) has an end which engages the oblique surface groove (8) and which end is made in a ball-shape.

* * * * *